(12) United States Patent
Robinson

(10) Patent No.: US 6,423,117 B1
(45) Date of Patent: Jul. 23, 2002

(54) EXTRACTION OF VALUABLE METAL BY ACID CYANIDE LEACH

(76) Inventor: Lee Fisher Robinson, 3 Athenaeum Hall, Vale of Health, London NW3 1AP (GB)

( * ) Notice: Subject to any disclaimer, the term of this patent is extended or adjusted under 35 U.S.C. 154(b) by 0 days.

(21) Appl. No.: 09/623,658

(22) PCT Filed: Mar. 2, 1999

(86) PCT No.: PCT/GB99/00616

§ 371 (c)(1),
(2), (4) Date: Sep. 1, 2000

(87) PCT Pub. No.: WO99/45159

PCT Pub. Date: Sep. 10, 1999

(30) Foreign Application Priority Data

Mar. 2, 1998 (GB) .............................. 9804486

(51) Int. Cl.⁷ ................................. C22B 3/06
(52) U.S. Cl. .......................................... 75/743; 75/744
(58) Field of Search ................... 75/743, 744

(56) References Cited

U.S. PATENT DOCUMENTS

| | | | | |
|---|---|---|---|---|
| 4,361,541 A | * | 11/1982 | Bings et al. | 423/20 |
| 4,578,163 A | * | 3/1986 | Kunter et al. | 75/744 |
| 5,215,575 A | * | 6/1993 | Butler | 75/744 |
| 5,425,800 A | * | 6/1995 | Buter et al. | 75/744 |

FOREIGN PATENT DOCUMENTS

| EP | 124213 A1 | * | 11/1984 |
|---|---|---|---|
| GB | 2518734 A | * | 11/1985 |

* cited by examiner

*Primary Examiner*—Roy King
*Assistant Examiner*—Tima McGuthry-Banks
(74) *Attorney, Agent, or Firm*—Fay, Sharpe, Fagan, Minnich & McKee, LLP

(57) ABSTRACT

The invention is concerned with techniques and apparatus suitable for extraction of at least one valuable metal such as one or more of: gold, platinum, silver, cobalt, nickel, molybdenum, and manganese from a starting material which, by way of example, could be freshly mined mixed ore containing both oxidic and refractory (sulphide) ores.

15 Claims, 1 Drawing Sheet

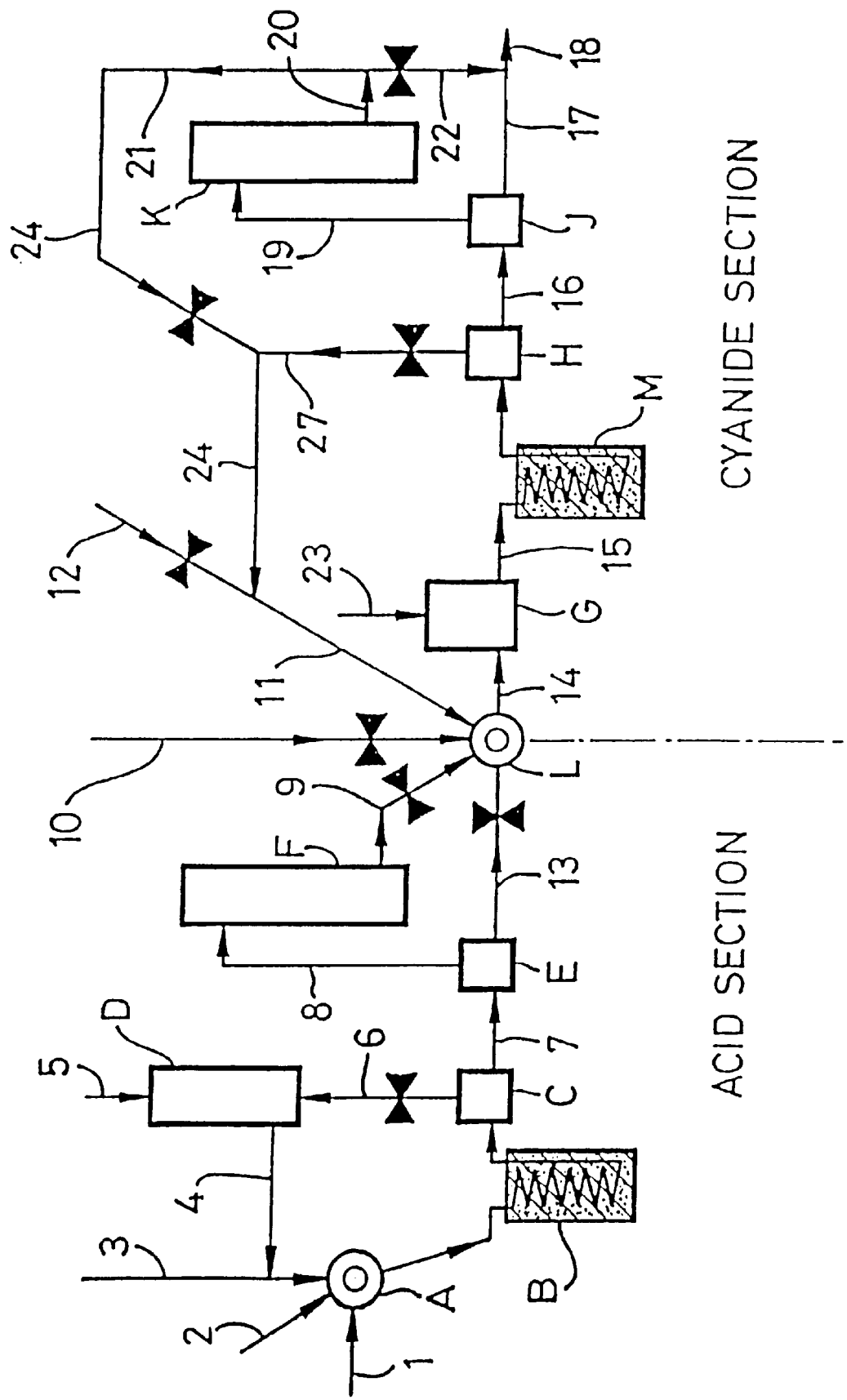

EXTRACTION OF VALUABLE METAL BY ACID CYANIDE LEACH

BACKGROUND OF THE INVENTION

This invention is concerned with processes and apparatus for the extraction of at least one valuable metal from materials such as composite mixtures of metallic compounds which may contain relatively small amounts of such valuable metal.

In particular the invention is concerned with techniques and apparatus suitable for extraction of at least one valuable metal such as one or more of: gold, platinum, silver, cobalt, nickel, molybdenum, and manganese from a starting material which, by way of example, could be freshly mined mixed ore containing both oxidic and refractory (sulphide) ores. The starting material could be subjected to valuable metal extraction in the form of an aqueous slurry containing such material. If required, the starting material e.g. mixed ore can be crushed and/or ground to appropriate particle size before treatment. The starting material could, during the course of extraction, become mixed into an aqueous slurry if it is desired to commence an extraction process upon solid particulate material.

However the present invention is not limited to the use of such dry or wet mixed ores as the starting material. It will become apparent that the present invention can be used to treat other material which comprises metallic oxide and/or metallic sulphide in addition to the said valuable metal whether the valuable metal is present in the form of metal or metallic compounds.

In the extraction of valuable metals, such as listed above the metals may be contained in matter such as tailings, slimes, calcined ores, and other discarded materials which have already been processed in some way, but which it is now economically viable to extract.

It has been commonplace for freshly mined ores, and material from mine dumps which are to be further treated, to be transported for comparatively large distances, such as several miles, to a processing plant. The ore or dump material is usually transported as a slurry through suitable pipelines. When the slurry reaches the processing plant it is subjected to valuable metal-leaching and subsequent extraction. The overall cost of pipelines, leaching and extraction apparatus is high, especially as the leaching process usually required elevated temperature and pressure.

Although the possibility of carrying out reactions such as leaching within the interior of a pipeline as a reactor vessel has been previously proposed, practical pipeline reactors for carrying out such pressure reactions have not been generally available until pipeline reactor vessels termed 'Hydrocoils' were made available. Such tubular pressure reactors are commercially available from the company, HMC Technology Limited.

For a description and drawing of such a tubular pressure reactor, the reader is referred to GB-A-2 158 734, the contents of which are incorporated herein, by reference. This prior reference also discloses by way of background a technique for extracting gold and other valuable metal from refractory ores by use of a leaching agent based on acid as an oxidising agent and sodium chloride as a source of halide ions. For further background information on extraction processes, the reader is also referred to prior specification EP-A-0 124 213, also incorporated herein by reference, wherein use of such a leaching agent is described in more detail.

BRIEF SUMMARY OF THE INVENTION

The present invention represents a significant technical advance upon the procedures referred to in these prior patent specifications, in that it seeks to provide an economic and yet convenient method of carrying out a sequential two-stage or combined single stage leaching process for the extraction of gold or other valuable metal from starting material e.g. mixed oxidic and refractory ore which hitherto has not been amenable to cyanide extraction.

In addition embodiments of the present invention can be operated so as to overcome a substantial technical prejudice in the art, against valuable metal extraction using cyanide in the presence of acid.

Firstly gold cyanide complex loading on carbon column retaining means is severely hindered in the presence of base metals, which preferentially compete with the gold complex for available carbon loading sites. The oxidic copper content in prior ore material treatments, for example, has been so high that the amount of carbon required in terms of retention columns rendered such a process uneconomic. However, we have demonstrated that base metals if present in solution will not load to any significant extent on such carbon retention means at the values of pH we prefer in our present extraction processes i.e. less than 4.0, preferably less than 3.0 but more preferably less than 2.0 pH.

Secondly there are not unreasonable safety/toxicity fears surrounding acidic conditions for cyanide treatments, with potential formation of poisonous hydrogen cyanide gas. Despite these technical prejudices our extraction conditions include the presence of acid, preferably nitric with sulphuric acid (a known catalyst) and an aqueous source of halide e.g. a saline solution, thus providing favourable conditions for conversion of hydrocyanic gas (if such should form or tend to form) to the soluble cyanide ion in solution. This is further aided by the process being preferably operated under pressure e.g. as a result of pump pressure and/or gas generation.

In a preferred embodiment of the process, in the acid treatment stage 1 the nitric acid leach converts sulphides to sulphates but also produces sulphuric acid (which is why the pH can stay low even after oxide(s) of nitrogen NOx's are flashed off)—hence stage 1 acid treatment and stage 2 cyanide treatment interlink so well. It may be necessary in stage 2 cyanide treatment to adjust the pH with slightly more sulphuric acid or alternatively making the reaction medium more alkaline—but stage 1 is in such an embodiment already producing some sulphuric acid in solution, which is desirable.

Such processes according to the invention can achieve and maintain a beneficial stability, with the minimum production of hydrogen cyanide gas.

According to this invention we provide a process for extracting at least one valuable metal from starting material comprising a plurality of metallic compounds including:

(i) said at least one valuable metal and/or compound thereof, (ii) oxide of at least one other metal, and optionally (iii) sulphide of the same or different other metal, which process includes treating the starting material with liquid. leaching agent containing (iv) acid and a source of halide ions, and with (v) the same or different liquid leaching agent containing a source of cyanide ions, so as to solubilise said valuable metal(s)

whereby liquor obtained from the treatment with leaching agent which contains said solubilised valuable metal(s), is caused to contact valuable metal retaining means wherein said valuable metal(s) is(are) retained.

Subsequently it is preferred to release the retained valuable metal(s) from said retaining means. This can be achieved by techniques which are well known in the art.

In a second aspect the invention also provides apparatus for carrying into effect the above process. Such apparatus is illustrated and described subsequently hereinafter, with reference to embodiments of the present invention.

BRIEF DESCRIPTION OF THE DRAWINGS

FIG. 1 depicts an apparatus for carrying into effect the present process.

DETAILED DESCRIPTION OF THE PREFERRED EMBODIMENTS

In the process of the present invention, the valuable metal(s) to be extracted can be one or more of gold, silver, platinum, cobalt, molybdenum, or manganese.

The starting material can be composite material in the nature of freshly mined ores or ore concentrates, which are preferably, although not essentially, dual ores in the sense of comprising a mixture of refractory (sulphide or mixed sulphide) type and oxidic type. Conventionally it is only the oxidic ore component alone which has been treatable by a cyanide leaching process to extract valuable metal.

The starting material, or the ore component of a starting material containing the ore, may be initially ground to a particle size not exceeding 250 micron, preferably not exceeding 200 micron, more preferably not exceeding 150 micron, most preferably not exceeding 100 micron, depending upon the ore(s) used.

However in addition to the above it is possible to use a composite starting material which is a liquid slurry comprising at least one of the following: slimes, tailings, previously treated concentrates, calcined ores, discarded materials and other such material containing a plurality of metallic compounds in addition to the valuable metal and/or compound(s) of the valuable metal. It is preferred to apply the process to such composite material which includes not only the valuable metal intended for extraction but also oxide of at least one other metal such as oxide(s) of base metal like iron oxide but together with sulphide, including mixed sulphide, of the same or different base metal e.g. iron sulphide and/or zinc sulphide and/or copper sulphide and/or lead sulphide. It is possible to apply the present process to extract valuable metal from composite starting materials which contain mixed sulphides e.g. chalcopyrite and/or arsenopyrite.

In the process, the extraction can be carried out with leaching agent which contains (iv) and (v) together, or the treatment may be carried out using leaching agent comprising (iv) followed by leaching agent comprising (v); or the treatment could be carried out using leaching agent comprising (v) followed by leaching agent comprising (iv).

However it is preferable to deploy an extraction process in which leaching agent containing (iv) is first used followed by the same or different leaching agent containing (v).

The acid used in component (iv) preferably includes or is nitric acid and the source of halide ions is preferably a source of chloride ions. Most preferably the source of halide ions comprises a chloride, such as sodium chloride which is readily commercially available. Preferably use of leaching agent (iv) is undertaken at a pH of less than 4.0, more preferably less than 3.0 and most preferably less than 2.0.

Component (v) may include, for example, sodium cyanide or hydrogen cyanide, or it may comprise cyanide ions in solution derived from a dissolved cyanide compound such as sodium cyanide in a liquid medium, in combination with hydrocyanic acid gas dissolved in that liquid medium.

Preferably sodium cyanide is used as component (v) since sodium chloride is the most preferred and cheapest source of Chloride Ion's in stage 1—and Sodium Cyanide is the almost universally used Cyanide form in the Gold-Cyanide extraction industry. The presently preferred process conditions, essentially "mimic" the standard method of producing Sodium Cyanide.

Treatment with leaching agent (iv) and (v) preferably produces a treated liquor containing the solubilised valuable metal(s) from the oxide and any sulphide components present in the starting material in dissolved ionic form or dissolved ionic complex form.

The valuable metal retaining means can be an absorbent such as one or more containers of activated carbon. In the apparatus, it is convenient for the container(s) of activated carbon, if used, to be easily removable and replaced and moreover it is preferable to use a plurality of such activated carbon containers in series or in parallel. At any convenient stage during the extraction process one or more of such activated carbon containers can be disconnected, recharged and/or replaced and re-installed.

Release of retained valuable metal e.g. gold from retaining means such as a container of activated carbon is a technique which is well known in the art and need not be elaborated upon. Once the valuable metal(s) have been released e.g. by techniques which are conventionally well known to those skilled in this art, the present extraction process has been fully completed, although this final step of extracting metal from the retaining means is not regarded as an essential feature of the present process, but rather a preferred feature.

In order that the invention may be illustrated, more easily appreciated, and readily carried into effect by those skilled in this art, embodiments of the invention will now be described by way of non-limiting examples only, with reference to the accompanying diagram representing a schematic flow chart of an extraction apparatus add process according to this invention.

In the illustrated arrangement an extraction process is shown using apparatus according to the invention for treating a mixed ore starting material comprising oxidic and refractory components. The mixed ore proceeds along line 1 to mixer tank A which includes pumps and heater units. Into the mixer tank A there is fed a saline solution via line 2 and a nitric acid supply via line 3. Nitric acid recovered, to be explained hereafter, is returned into original feed line 3 via return line 4 from a nitric acid recovery unit D. After mixing and heating if required the treatment mixture is fed from mixer tank A to a reactor vessel B. Preferably this reactor vessel comprises at least one tubular reactor which is reinforced to withstand pressure. More preferably this tubular reactor is embedded in support material such as reinforced concrete or sand so that the walls of the tubular in element are protected against the internal pressures which may be encountered during the reaction. It is most preferred for the reactor vessel B to comprise one or more such tubular reactor vessels, in series. It is even more preferable for such reactor to comprise a coiled tube encased in suitable reinforcement, and especially as described in prior specification GB 2-158734A.

The reaction mixture from the reactor vessel B is fed as a liquid slurry to a gaseous removal unit, referred to as a flash off unit C wherein oxides of nitrogen formed in the reactor vessel B can be discharged and/or further treated. Indeed it is preferred for the oxides of nitrogen to be fed via line 6 to a nitric acid recovery unit D which itself is supplied with a dilute nitric acid wash via line 5. Thus as indicated above, nitric acid which has been recovered after "flash off" in unit C is recycled into the original supply line 3.

The treated liquor then passes from the gaseous removal unit C via line 7 to a filtration unit E to remove particulates above about 50 micron, preferably above 20 micron, more preferably above 10 micron. The filtered solution then passes from the filtration unit via line 8 to a retaining means in the form of an activated carbon column F. In the activated column F, at least some of the valuable metals to be extracted will be absorbed, and can be subsequently released by techniques which are well known in the art and need not be explained in detail herein. Component F in the schematic illustration is a removable and replaceable activated carbon canister. It can be replaced or regenerated in-situ, Moreover more than one such carbon column can be used in parallel and/or in series. If used in parallel, better access is given to each individual carbon column for replacement or in-situ regeneration.

The filtered solids from the acids/saline treatment section of the apparatus then pass to a secondary mixer tank and pump unit L. Also supplied to mixer tank/pump L is the valuable metal-depleted liquid from the activated carbon column(s) F, via line 9.

There is also supplied into the secondary mixer tank and pump unit L, via line 10, an input for additional saline solution which can also include sulphuric acid if required, as a catalyst. Moreover a further inlet supply line 11 to mixer tank/pump unit L comprises the input for aqueous cyanide e.g. sodium cyanide in solution and/or hydrocyanic gas in solution. Preceding this inlet line 11, is an initial supply line 12 which is intended to supply the aqueous cyanide for the cyanide treatment section of the illustrated apparatus. The solids and liquor from secondary pump/mixer tank L proceeds via line 14 to a unit G intended to adjust the pH of the liquid slurry to be further treated. G is a pH adjusting and optionally heating unit which is itself supplied by an inlet line 23 providing acid and/or alkali medium to adjust the pH of the liquid before treatment from whence it proceeds via the continuous supply line 15 to a secondary gaseous exchange unit H or "flash off" unit wherein hydrocyanic gas may be evolved.

There is preferably located, as shown, between item G and item H a pressure reaction vessel M preferably in the nature of a tubular such reactor vessel similar to or substantially the same as item B in the preceding acid treatment section. Again it is preferred that such reactor vessel M include one or more Hydrocoil (Trade Mark) type coiled tubular reactor vessels wherein the remaining solids and solution from the acid treatment section are treated by the cyanide component before reaching the flash off unit H. Cyanide gas from flash off unit H can be dissolved in water and passed via line 27 to be returned into the cyanide supply feed 12, 11 via branch 24.

After cyanide flash off at unit H, the treated liquor which is essentially stripped of formed gas and comprising solids material passes to a secondary filtration unit J where particulates above about 50 micron, preferably above 20 micron, more preferably above 10 micron are removed. The treated liquor then passes from the filtration unit J via line 19 to a secondary activated container K. As with the carbon container F in the acid treatment section, the activated carbon container K can be one or more activated carbon canisters in series or in parallel. It is preferred for there to be at least two such activated carbon containers in parallel, so that the supply can be appropriately switched to an operative column to assist cleaning, regeneration or replacement of the at least one other such carbon column K. The valuable metal-stripped liquor then passes from carbon column(s) K, via line 20 to a partially stripped liquor supply line 21 which is returned to the cyanide section for further treatment i.e. there is a junction between line 21 and liquor return line 24 from the cyanide flash off unit H with an option for this spent liquid to proceed via line 22 to be subsequently mixed in with solids from the filtration unit J via line 17 to proceed (subsequently via line 18) to neutralisation and final disposal (means not shown in detail).

In the drawing the symbol ▸◂ shows gaseous non-return valves.

It will be appreciated that the arrangement is for a sequential acid/halide extraction process followed immediately by a cyanide extraction process which preferably involves the use of at least one reinforced tubular reactor preferably a coiled such tubular reactor and more preferably a suitably reinforced coiled tubular reactor. Such reactor B and if used between items G and H above, can be the commercially available 'Hydrocoil' units which may be arranged as a series of coiled units.

The above arrangement demonstrates extraction of at least one valuable metal such as gold from a mixed oxidic refractory material by a two-stage sequential process involving an acid/halide extraction followed immediately, without purification or interruption of the supply of leaching agent (iv) by a cyanide treatment section by addition of a different leaching agent (v) to the treated liquor derived from extraction by leaching agent (iv). This is specifically intended to extract gold and/or other such valuable metal from the solids mixture input line 1 which optionally but preferably includes one or more components bearing valuable metal extractable by cyanide.

Thus such a process and apparatus not only confers a technical advance but also overcomes a technical prejudice by providing acid extraction treatment in combination with, sequential to or prior to an extraction treatment involving cyanide in the recovery of important valuable metals, with minimal production of and/or even use of formed hydrocyanic acid gas.

In the apparatus, the reactor vessels B and M could be portable and transportable from site to site. It is not essential to use proprietary Hydrocoil (Trade Mark) units which are fixed in the ground, with the coil(s) at below ground level, providing whatever reinforcement is used is capable of maintaining the integrity of the pressure vessel under typical or even extreme operating conditions.

EXAMPLE 1

A large gold mine has a mixed refractory ore. The total production is 1,500 tons per day with a Gold content of 3.47 grams per tons. The sulphur content average is 1.62%.

This is sufficient to interfere with cyanide treatment of the total so a concentration by flotation stage is introduced by which the sulphidic (refractory) ore is removed at rate of 150 tons per day. This leads to a concentrate containing 35 to 45 grams per tons but with a sulphur content of 24.3% Sulphur. This is of course even more difficult to Cyanide.

In order to make a reasonable recovery from the concentrate the following methods were examined.
1. High pressure oxidation in an autoclave. Ruled out on grounds of cost.
2. Roasting of the concentrate. Quite unacceptable on environmental grounds and also costly.
3. High pressure steam-cyanide. Costly and of limited effectiveness.

The cyanide treatment of the concentrate leads to a cyanide tailings containing no less than 6.5 grams per tons or a loss of $US 2.7 Million per annum.

It must also be remembered that the concentration step, with the need for additional finer grinding is itself costly, and in this case complicated by the presence of a clay fraction:—making the grinding more difficult. Every additional step in ore dressing or separation has its own associated metal loss.

The first solution is to introduce the acid-saline leaching process to treat only the tailings, which can be done without affecting the existing plant, since no recovery is being achieved from this portion.

The second is to extend to the concentrate.

It would ideally be beneficial to treat the entire body without concentration, thus saving on capital and running costs, whilst increasing the yield.

This can, however, be achieved by using the present combined mixed ore extraction process. Eliminating the need for separation stages, converting the sulphides to sulphates and leaching the refractory gold in stage 1 followed by radical cyanide treatment in stage 2 in what is a single highly integrated plant.

EXAMPLE 2

An industrial waste stream of incinerated slag contained high precious metal content and a moderate sulphur content but other poisons to cyanide such as antimony and tellurium. This material has proved obdurate to cyanide treatment partly because of the semi-slag nature of the ash. It has been suggested to attrition grind the ash to make more sites available to cyanide attack. Not only is this extremely expensive but also it does not overcome the problem of the chemically hostile compounds.

This situation has been sustained for many years with an average of 6 grams per tons gold and 116 grams of silver and other metals such as cobalt and nickel, and platinoids, going to land fill at the rate of 15,000 Tons per annum. This is obviously quite unacceptable. Nil recovery is being achieved.

The situation can be much improved by recovering the precious metals in an acid/saline process, but even better total recovery could be achieved using the present combined ore extraction process which will pick up all the metallic elements.

It also renders the ash suitable after lime neutralisation as a base for soil lightening fertiliser. The sequential leaching process will also add some nitrate and sulphates to the residual ash.

What is claimed is:

1. A process for extracting at least one valuable metal from starting material comprising a plurality of metallic compounds including (i) said at least one valuable metal and/or compound thereof, (ii) oxide of at least one other metal and (iii) sulphide of the same or different other metal, which process includes treating the starting material with a first liquid leaching agent at a pH of less than 4.0 containing (iv) acid and sodium chloride and, subsequently with a second liquid leaching agent containing (v) a source of cyanide ions, so as to solubilize said valuable metals(s), and whereby liquor at a pH of less than 4.0 obtained from the treatment with said second leaching agent which contains said solubilized valuable metals(s) is caused to contact valuable metal-retaining means wherein said valuable metal(s) is (are) retained.

2. A process as claimed in claim 1 followed by release of the retained valuable metal(s) from said retaining means.

3. A process as claimed in claim 1 wherein the valuable metal to be extracted is selected from the group consisting of gold, silver, platinum, cobalt, nickel, molybdenum, manganese, or combinations thereof.

4. A process as claimed in claim 1 wherein said other metals is a base metal selected from the group consisting of iron, zinc, lead, copper, or combinations thereof.

5. A process as claimed in claim 1 in which (iii) comprises mixed sulphide ions selected from one or more of chalcopyrite and arsenopyrite.

6. A process as claimed in claim 1 wherein the liquor containing solubilized valuable metal(s) is caused to contact the valuable metal retaining means while its pH is less than 3.

7. A process as claimed in claim 1 wherein the starting material comprises mined ore containing metallic oxide.

8. A process as claimed in claim 7 wherein the mined ore is a mixed ore further comprising metallic sulphide.

9. A process as claimed in claim 7 wherein the ore is crushed and/or ground to a particle size that is suitable for a metallic oxide ore, and that does not exceed 250 microns, before the treatment.

10. A process as claimed in claim 1 wherein the starting material comprises at least one material selected from the group consisting of an ore concentrate, liquid slurry containing slimes or tailings or previously treated ore concentrates, calcined ores, and discarded materials.

11. A process as claimed in claim 1 wherein the starting material is initially ground to a particle size not exceeding 250 micron prior to the treatment.

12. A process as claimed in claim 1 wherein the acid in component (iv) essentially consists of nitric acid.

13. A process as claimed in claim 1 wherein component (v) essentially consists of cyanide ions in solution derived from a dissolved cyanide compound.

14. A process as claimed in claim 1 wherein the retaining means comprises a plurality of containers of activated carbon.

15. A process as claimed in claim 6 wherein the pH is less than 2.0.

* * * * *